United States Patent
Davis et al.

(10) Patent No.: US 7,088,360 B1
(45) Date of Patent: Aug. 8, 2006

(54) SIMPLIFIED IDENTIFIER GENERATION IN A COMPUTER AIDED DESIGN (CAD) ENVIRONMENT

(75) Inventors: Kenneth L. Davis, San Diego, CA (US); William E. Bogan, Lakeside, CA (US)

(73) Assignee: Autodesk, Inc., San Rafael, CA (US)

( * ) Notice: Subject to any disclaimer, the term of this patent is extended or adjusted under 35 U.S.C. 154(b) by 463 days.

(21) Appl. No.: 10/199,971

(22) Filed: Jul. 20, 2002

(51) Int. Cl.
*G06T 15/00* (2006.01)

(52) U.S. Cl. .................. 345/420; 707/101; 707/102; 434/85; 434/92

(58) Field of Classification Search ............... 345/420, 345/419, 441, 581; 700/98; 707/101, 102; 434/85, 92
See application file for complete search history.

(56) References Cited

U.S. PATENT DOCUMENTS

| | | | | |
|---|---|---|---|---|
| 4,843,569 A | 6/1989 | Sawada et al. | ............ | 382/180 |
| 5,237,647 A * | 8/1993 | Roberts et al. | ............ | 345/419 |
| 5,386,504 A | 1/1995 | Yoda | ............ | 715/798 |
| 5,526,478 A | 6/1996 | Russell, Jr. et al. | ........ | 715/512 |
| 5,559,707 A * | 9/1996 | DeLorme et al. | ........... | 701/200 |
| 5,617,524 A | 4/1997 | Dao et al. | ............ | 345/443 |
| 5,625,827 A * | 4/1997 | Krause et al. | ............ | 715/502 |
| 5,724,072 A | 3/1998 | Freeman et al. | ........... | 345/648 |
| 5,745,761 A | 4/1998 | Celi, Jr. et al. | ............ | 719/323 |
| 5,774,720 A | 6/1998 | Borgeendale et al. | ....... | 719/329 |
| 5,831,633 A | 11/1998 | Van Roy | ............ | 345/441 |
| 5,835,693 A | 11/1998 | Lynch et al. | ............ | 345/473 |
| 5,845,288 A * | 12/1998 | Syeda-Mahmood | ......... | 707/102 |
| 6,243,102 B1 | 6/2001 | Ruff et al. | ............ | 345/619 |
| 6,289,396 B1 | 9/2001 | Keller et al. | ............ | 719/323 |
| 6,366,293 B1 * | 4/2002 | Hamilton et al. | ........... | 345/649 |
| 6,496,195 B1 | 12/2002 | Gill et al. | ............ | 345/522 |
| 6,611,725 B1 * | 8/2003 | Harrison et al. | ............. | 700/98 |
| 6,768,928 B1 * | 7/2004 | Nagasawa et al. | ............ | 700/98 |
| 6,810,401 B1 * | 10/2004 | Thompson et al. | ........ | 707/101 |
| 2003/0165264 A1 | 9/2003 | Tanabe et al. | ............. | 382/141 |

OTHER PUBLICATIONS

Vivier et al., Annotation: an AI approach to Engineering Drawing Annotation, ACM SIGART, Mar. 1988, pp. 447-455.*
Nousch et al., CAD on the World Wide Web: Virtual Assembly of Furniture with BEAVER, SIGGRAPH, ACM, Feb. 1999, pp. 113-119.*
Bidarra et al., A Collaborative Framework for Integrated Part and Assembly Modeling Proceedings of the furth symposium o Virtual Reality Modeling Language, ACM, Jun. 2002, pp. 389-400.*

(Continued)

*Primary Examiner*—Phu K. Nguyen
(74) *Attorney, Agent, or Firm*—Fish & Richardson P.C.

(57) ABSTRACT

The invention includes computer instructions that operate to receive a request to generate an identifier in a computer aided design (CAD) application. Additionally, the instructions operate to determine if an input corresponds to a predetermined shape for the identifier, the input being a single variable input. Then, the instructions operate to generate the identifier with the predetermined shape based at least in part on the input. As a result, an improved way of generating geometric shapes for identifiers is facilitated.

48 Claims, 6 Drawing Sheets

OTHER PUBLICATIONS

Hutton et al., A Strategy for On-line Interpretation of Sketched Engineering Drawing, Document Annalysis and Recognition, Aug. 1997, pp. 771-775.*

Krause et al., "Processing of CAD-Data—Conversion, Verification and Repair", *Solid Modeling*, 1997, pp. 248-254.

http://www/ugsolutions.com/products/unigraphics/cad/drafting, printed May 1, 2000, 2 pgs.

Finkelstein, "AutoCAD 2002 Bible, Part II" 2002, pp. 400-406.

Banach et al., "Autodesk Inventor 6 *Essentials*", 2003, pp. 271-284.

* cited by examiner

| INPUT | SHAPE |
|---|---|
| 0 (ZERO) / C | CIRCLE |
| 1 / U | UNDERLINED |
| 2 / S | |
| 3 / T | POLYGON 3 SIDES (TRIANGLE) |
| n / LETTER OF POLYGON | POLYGON WITH n SIDES |

410 — INPUT column
415 — SHAPE column

SIMPLIFIED IDENTIFIER GENERATION IN A COMPUTER AIDED DESIGN (CAD) ENVIRONMENT

FIELD OF INVENTION

The present invention relates to the field of computer aided design (CAD). More specifically, the present invention relates to computer assistance to a designer working with identifiers a mechanical design.

BACKGROUND OF THE INVENTION

Most mechanical designs require a designer to create a drawing to identify geometry pieces that make up components of a mechanical design. An example of components of a mechanical design is a nut and bolt assembly where the nut and bolt make up the components of the assembly. Once a designer has completed the geometry pieces of an assembly, the designer creates a display identifying the individual components that make up the assembly. For the purposes of this application, the geometry pieces that make up the components of a mechanical design are solid CAD geometry pieces and shall be generically referred to as geometry pieces.

Generally, identifying individual geometry pieces of an assembly is labor intensive requiring creation of an identifier, usually in the form of an identity symbol and a leader from the geometry piece to the identity symbol, for each geometry piece in separate sequence of commands, multiple executions of the same commands, and a large number of key strokes. Thus, as the number of geometry pieces of an assembly increases, the time required to identify the geometry pieces increases. Moreover, once the identifiers have been created, a users has difficulty changing the position of the identifier because the ordering of the geometry pieces would have to be manually changed to remain consistent with the identifier position.

Thus, a more user friendly approach for creating identifiers is desired. As will be described in more detail below, the present invention achieves this and other desirable objectives, which will be apparent from the disclosure to follow.

BRIEF DESCRIPTION OF DRAWINGS

The present invention will be described by way of exemplary embodiments, but not limitations, illustrated in the accompanying drawings in which like references denote similar elements, and in which:

FIG. 4 illustrates an exemplary table of inputs and resulting identifier shape, in accordance with one embodiment of the present invention;

DETAILED DESCRIPTION OF THE INVENTION

Figure 1:
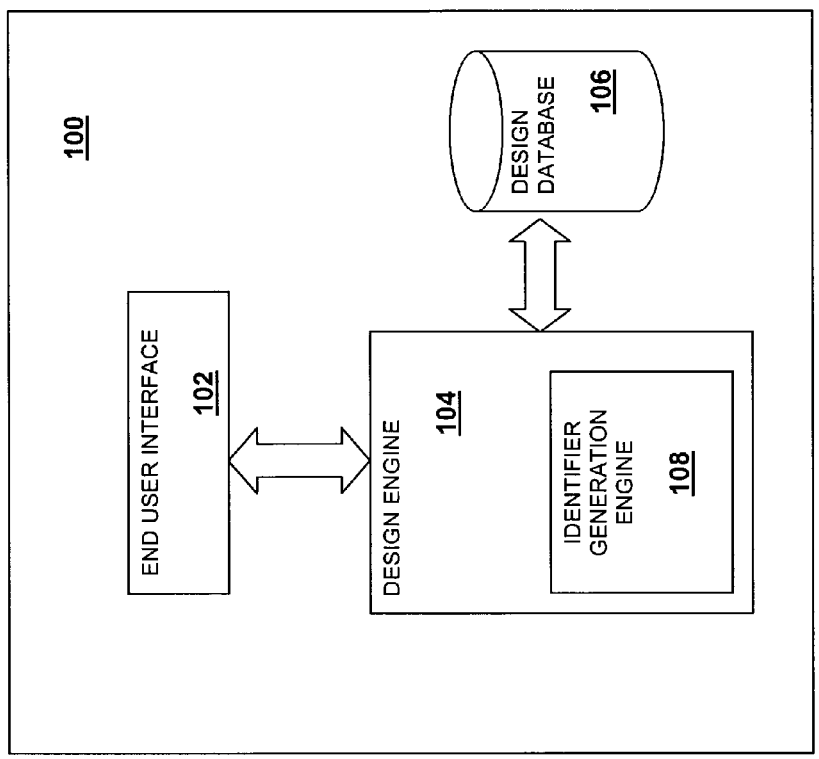
FIG. 1 illustrates a block diagram of one embodiment of a mechanical design application for facilitating automatic generation of identifiers for a mechanical design, in accordance with the present invention.

In the following description, various aspects of the present invention will be described. However, it will be apparent to those skilled in the art that the present invention may be practiced with only some or all aspects of the present invention. For purposes of explanation, specific numbers, materials and configurations are set forth in order to provide a thorough understanding of the present invention. However, it will also be apparent to one skilled in the art that the present invention may be practiced without the specific details. In other instances, well known features are omitted or simplified in order not to obscure the present invention.

Parts of the description will be presented in terms of operations performed by a computer system, using terms such as data, flags, bits, values, characters, strings, numbers and the like, consistent with the manner commonly employed by those skilled in the art to convey the substance of their work to others skilled in the art. As well understood by those skilled in the art, these quantities take the form of electrical, magnetic, or optical signals capable of being stored, transferred, combined, and otherwise manipulated through mechanical and electrical components of the computer system; and the term computer system include general purpose as well as special purpose data processing machines, systems, and the like, that are standalone, adjunct or embedded.

Various operations will be described as multiple discrete steps in turn, in a manner that is most helpful in understanding the present invention, however, the order of description should not be construed as to imply that these operations are necessarily order dependent. In particular, these operations need not be performed in the order of presentation.

Reference throughout this specification to "one embodiment" or "an embodiment" means that a particular feature, structure, or characteristic described in connection with the embodiment is included in at least one embodiment of the invention. Thus, the appearances of the phrases "in one embodiment" or "in an embodiment" in various places throughout this specification are not necessarily all referring to the same embodiment or invention. Furthermore, the particular features, structures, or characteristics may be combined in any suitable manner in one or more embodiments.

For the purposes of describing the invention, in a computer aided design (CAD) environment, a geometry piece may be a 2-D geometry piece, such as, but not limited to, a line, arc, point, and so forth. Additionally, the geometry piece may be a 3-D geometry piece having solid properties, such as, but not limited to, volume, weight, and density.

In the CAD environment, an identifier may be a CAD entity that conveys some form of information. For example, an identifier may be a number, or any other type of textual information encapsulated in a geometric shape.

In various embodiments of the invention, automatic generation of geometric shapes for identifiers is facilitated. This and other advantages will be evident from the disclosure.

FIG. 1 illustrates a block diagram of one embodiment of a mechanical design application for facilitating automatic generation of identifiers for a mechanical design, in accordance with the present invention. In FIG. 1, mechanical design application 100 includes an end user interface 102, a design engine 104, and a design database 106. The design engine 104 includes, in particular, identifier generation engine 103, in accordance with the invention. Together, the elements cooperate to automatically generate various shapes for identifiers, in accordance with one embodiment of the invention.

In FIG. 1, the end user interface 102 operates to graphically display and receive various inputs corresponding to identifier generation. Under the control of the design engine 104, the design database 106 operates to store information regarding the received various inputs for the identifier. Once the information regarding the received various inputs for the identifier has been stored, and upon receiving an indication that an identifier is to be generated, the identifier generation engine 103 automatically utilizes various data to automatically generate and display a visual representation of a geometric shape for the identifier.

Except for the teachings of the present invention incorporated in the identifier generation engine 103, the mechanical design application 100 is intended to represent a broad range of CAD software known in the art, including but not limited to Autodesk Inventor™, available from Autodesk, Inc. of San Rafael, Calif.

Figure 2:
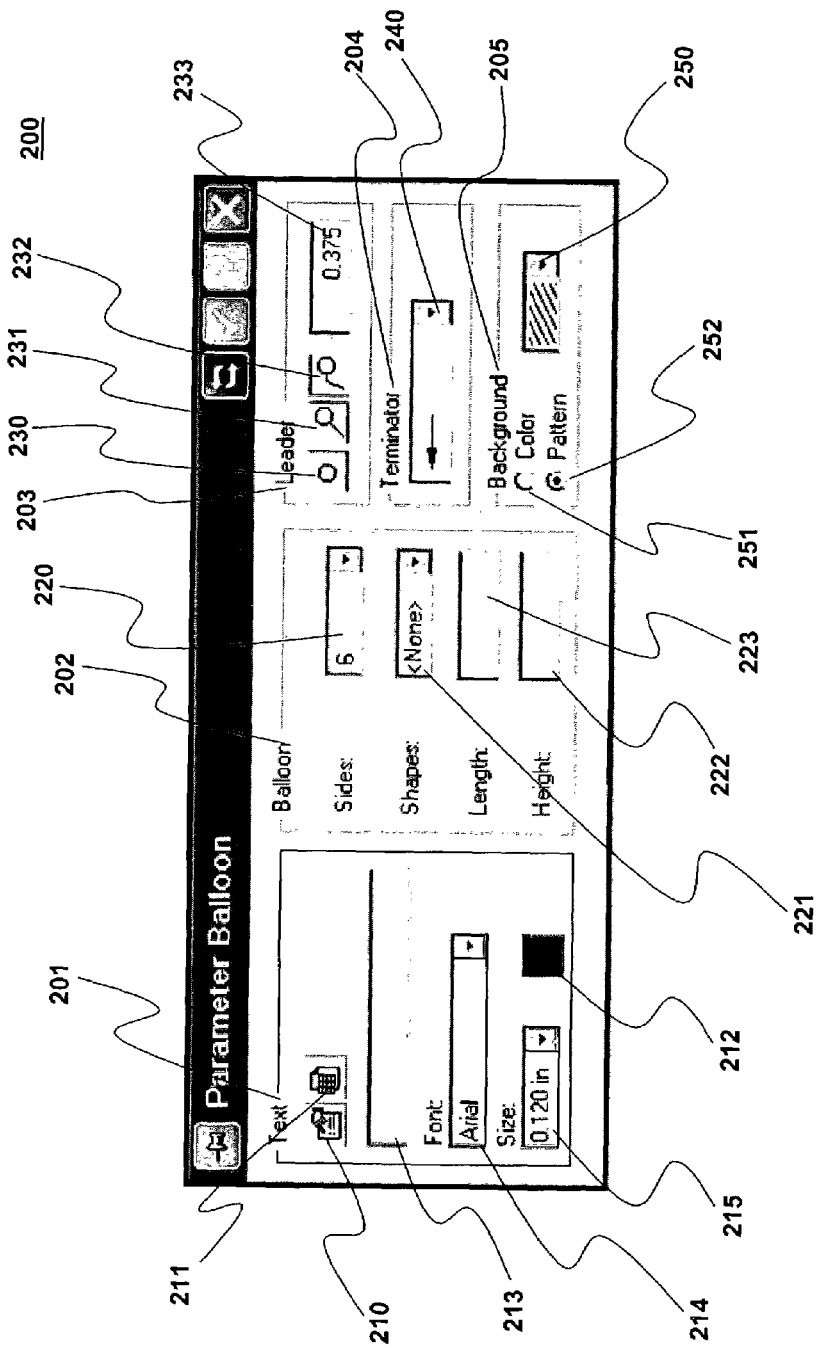
FIG. 2 illustrates an exemplary dialogue box through which input(s) may be received for generating an identifier, in accordance with one embodiment of the present invention.

FIG. 2 illustrates an exemplary dialogue box through which input(s) may be received for generating an identifier, in accordance with one embodiment of the present invention. Shown in FIG. 2, dialogue box 200 may be displayed in the form of a graphical user interface, such as, but not limited to, a dialogue box generated in the Windows® operating systems. Accordingly, for the purposes of describing the present invention, user interaction with the dialogue box 200 can be described in terms of the CAD application receiving various inputs.

In FIG. 2, the dialogue box 200 includes various panels to facilitate receiving various inputs associated with various aspects of generating an identifier. A first panel 201 may be associated with parameters for text generation, a second panel 202 may be associated with parameters for identifier generation, and a third panel 203 may be associated with parameters for leader generation. Additionally, a fourth panel 204 may be associated with generation of type of terminator for the leader, and a fifth panel 205 may be associated with generation of a background for the identifier. As shown, each of the panels 201–205 includes various fields for receiving inputs.

In order to facilitate receiving inputs associated with parameters for text generation, for the illustrated embodiment, the first panel 201 includes three graphical representations of buttons 210–211, where a first button 210 may be to facilitate property selection input for the text, such as, but not limited to, bold, italics, etc. A second button 211 may be to facilitate model parameter selection input, such as, but not limited to, linking dimensions and/or text to a spreadsheet (i.e., user defined parameters for the text). A third button 212 may be to facilitate text color selection input. Additionally, the first panel 201 includes an input field 213 to receive a text string, a first drop down menu 214 to receive a font selection input, and a second drop down menu 215 to receive a text size input. Accordingly, the buttons 210–212, the input field 213, and the drop down menus 214–215 of the first panel 201 facilitate receiving inputs associated with various parameters of the text generated for the identifier.

In the embodiment of FIG. 2, in order to facilitate receiving inputs associated with parameters for identifier generation, the second panel 202 includes two drop down menus 220–221. The first drop down menu 220 facilitates receiving an input for defining the shape of the identifier, where the shape may be defined by an integer or a letter, as will be described below. The second drop down menu 221 facilitates receiving an input for a predefined shape of the identifier. Additionally, the second panel 202 includes two input fields 222–223 to define an overall size of the identifier. The first input field 222 can be provided to receive a first number to define the length of the identifier, while the second input field 223 can be provided to receive a second number to define the height of the identifier. The drop down menus 220–221 and the input fields 222–223 of the second panel 202 facilitate receiving inputs associated with parameters for identifier generation.

In FIG. 2, the third panel 203 includes three graphical representations of buttons 230–232, which may be associated with parameters for leader generation for the identifier. For example, in the embodiment shown, selection of the first button 230 provides for a leaderless identifier, selection of the second button 231 provides for a straight leader for the identifier, and selection of the third button 232 provides for a leader having a landing for the identifier. In the second third panel 203, if the third button 232 is selected, the length of the landing may be defined by receiving a dimension via a landing dimension input field 233. Accordingly, in the third panel 203, the buttons 230–232 and the input field 233 facilitate receiving inputs for leader generation for the identifier.

The fourth panel 204 includes a drop down menu 240 to facilitate receiving an input for the type of terminator for the leader of the identifier. That is, the terminator for the leader may be an arrow (filled in or not), a circle (filled in or not), and so forth. Accordingly, the fourth panel 204 facilitates receiving inputs for the terminator of the leader for the identifier.

In the embodiment illustrated in FIG. 2, the fifth panel 205 includes two inputs 251–252 for selection of graphical characteristics of the background of the identifier. Additionally, responsive to selection of the inputs 251–252, a drop-down menu 250 facilitates selection of various graphical characteristics of the background. For example, if the input 251 associated with color is selected, the drop down menu may include various colors, or alternatively, if the input 252 associated with pattern is selected, the dropdown menu 250 may include various patterns, cross-hatching, dots, and so forth. The selections provided by the dropdown menu 250 can be based at least upon the inputs 251–252. Accordingly, the fifth panel 205 facilitates selection of a background for the identifier.

As will be described in detail below, the enhanced dialogue box 200, having the various panels 201–205 facilitate simplified automatic generation of identifiers.

Figure 3:
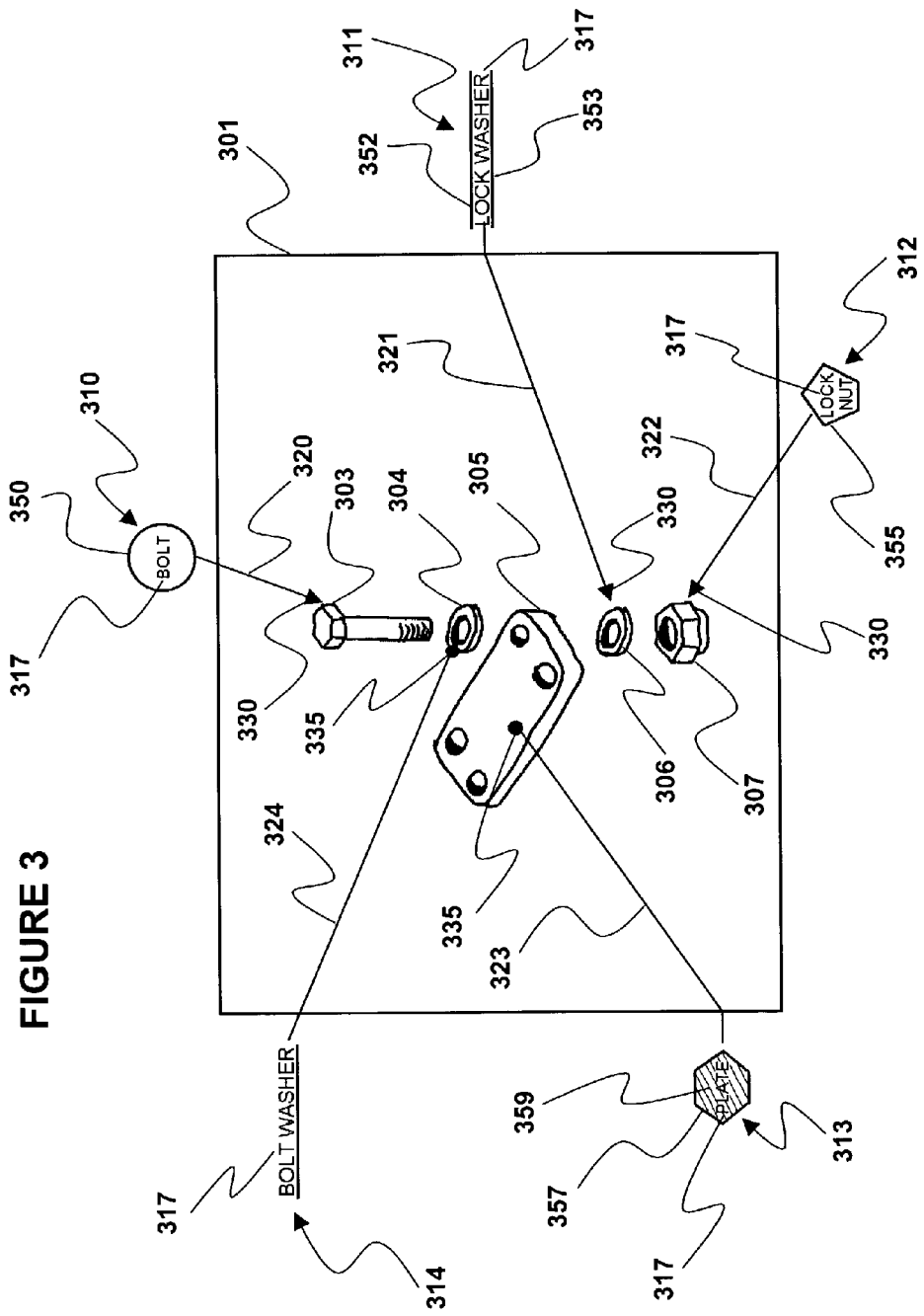
FIG. 3 illustrates identifiers generated responsive to the received inputs, in accordance with one embodiment of the present invention.

FIG. 3 illustrates identifiers generated responsive to the received inputs, in accordance with one embodiment of the present invention. Illustrated in FIG. 3, is the graphical representation of a view boundary 301 with geometry pieces 303–307. Additionally, along each side of the view boundary 301, are a number of identifiers 310–314, each having some form of text 317. In the embodiment shown, associated with each of the identifiers 310–314 is a leader 320–324. As alluded to earlier, the identifiers 310–314 and the leaders 320–324 may vary based at least upon received inputs via the dialogue box 200 (shown in FIG. 2).

For ease of describing the invention, the view boundary 301 is shown. Furthermore, for ease of understanding, references will be made to the sides of the view boundary 301, which is illustrated as being substantially rectangular.

Accordingly, the sides will be referred to as the top side, right side, bottom side, and left side. However, the view boundary 301 need not be shown because the identifiers 310–314 may be located in any position on a display.

Illustrated in FIG. 3, the identifier 310 located along the top side of the view boundary 301 has a substantially circular shape. In particular, the circular shape comprises of a circle 350 having text 317. Because the identifier 310 is generated responsive to various received inputs such as dialogue box 200 (shown in FIG. 2) references will be made to both FIGS. 2 & 3. For example, referring back to FIG. 2, in order to generate the identifier 310 having the text 317, the text 317 may be received via input field 213 of the first panel 201. The leader 320 may be generated in response to selection of the second button 231 of the third panel 203. The terminator 330 for the leader 320 of the identifier 310 may be generated in response to a received input via the fourth panel 204.

In the embodiment shown in FIG. 3, the shape of the identifier 310, in particular, the circle 350 is generated responsive to a received input via the first drop down menu 220 (shown in FIG. 2) for defining the shape of the identifier. Referring back to FIG. 2, in one embodiment, the identifier shape may be based at least in part on a received input of a single variable, such as, for example, an alphanumeric input, in the first drop down menu 220 of the second panel 202. Accordingly, the circle 350 of FIG. 3 may be generated responsive to the received alphanumeric input of a "0" indicating that the shape of the identifier be substantially circular in shape. Alternatively, the alphanumeric input may be a "C" also indicating that the shape of the identifier be substantially circular in shape. Thus, the identifier 310 in the shape of the circle 350 is automatically generated and displayed from the received input of a single variable.

Shown in FIG. 3 is the identifier 311 located along the right side of the view boundary 301 having a shape responsive to alternative inputs such as those from the enhanced dialogue box 200. The shape of the identifier 311 comprises of a first line 352 over text 317 and a second line 353 under text 317, thereby "sandwiching" text 317 as shown. As previously described, the identifier 311 is generated responsive to various received inputs via enhanced dialogue box 200 (shown in FIG. 2). However, unlike the previous example, the identifier 311 may be generated responsive to alternate received inputs. For example, the leader 321 may be generated in response to selection of the second button 232 of the third panel 203. Additionally, the two lines 352 & 353 are generated responsive to received inputs via the first drop down menu 220, in accordance with the embodiment illustrated in FIG. 2 & 3.

As previously described, in one embodiment, the identifier shape may be based at least in part on a received input of a single variable such as in the first drop down menu 220 of the second panel 202. Accordingly, the two lines 352 & 353 are automatically generated responsive to the received alphanumeric input of "2" indicating that the shape of the identifier have two lines 352 & 353. Alternatively, the alphanumeric input may be an "S" indicating that the shape of the identifier be a shape having text sandwiched between two lines.

Shown in FIG. 3 is the identifier 312 located along the bottom side of the view boundary 301 having a shape responsive to further alternative inputs such as those from the enhanced dialogue box 200. The identifier 312 has a substantially pentagonal shape. In particular, the identifier 312 comprises of a pentagon 355 having text 317. As previously described, referring back to FIG. 2, in order to generate the identifier 312 having text 317, the text 317 may be received via input field 213 of the first panel 201. The leader 322 may be generated in response to selection of the second button 231 of the third panel 203. The terminator 330 for the leader 322 may be generated in response to a received input via the fourth panel 204.

In the embodiment shown in FIG. 3, the shape of the identifier 312, in particular, the pentagon 355, is generated responsive to a received input via the first drop down menu 220 (shown in FIG. 2) for defining the shape of the identifier. Referring back to FIG. 2, here again, in one embodiment, the identifier shape is based at least in part on a received input of a single variable. Accordingly, the pentagon 355 is automatically generated responsive to the received alphanumeric input of "5" indicating that the shape of the identifier have five lines (i.e., five-sided polygon). Alternatively, the alphanumeric input may be a "P" indicating that the shape of the identifier be a shape of a pentagon.

In FIG. 3, the identifier 313 is shown located along the left side of the view boundary 301 having a shape responsive to yet further alternative inputs. The identifier 312 has a substantially hexagonal shape. In particular, the identifier 313 comprises of a hexagon 357 having text 317. As previously described, the identifier 313 may be generated responsive to various inputs via enhanced dialogue box 200 (shown in FIG. 2). However, unlike the previous examples, the identifier 313 may be generated responsive to further variations in the received inputs. For example, the leader 323 may be generated in response to selection of the third button 232 of the third panel 203 of the dialogue box 200. Here again, the shape of the identifier is be based at least in part on a received input of a single variable. Accordingly, the hexagon 357 of FIG. 3 is generated responsive to the received alphanumeric input of a "6" indicating that the shape of the identifier be substantially hexagonal in shape. Alternatively, the alphanumeric input may be an "H" also indicating that the shape of the identifier be substantially hexagonal in shape.

Illustrated in FIG. 3, the identifier 313 includes a background 359. The background 359 may be generated in response to receiving various inputs via various fields in the dialogue box 200 (shown in FIG. 2). In particular, the input 251 of the fifth field 205 of the dialogue box 200 may be selected indicating a pattern is to be generated for the identifier 313. Further, the dropdown menu 250 of the fifth panel 205 may be also be selected indicating a type of pattern to be generated for the identifier 313. Additionally, the terminator 335 of the leader 323 of the identifier 313 on geometry piece 305 is shown as a spot type. As described above, the terminator 335 may be generated responsive received input via drop down menu 240 of the fourth panel 204 of the dialogue box 200 (shown in FIG. 2).

Illustrated in FIG. 3, the identifiers 310–314 are along the sides of the view boundary 301. However, as previously alluded to, the identifiers 310–314 may be arranged in any manner. Further, the identifiers may be automatically modified responsive to manipulation by the user. Examples of automatic modification of identifiers responsive to manipulation by the user may be found in co-pending U.S. patent application Ser. No. 09/495,030, titled METHOD AND APPARATUS FOR AUTOMATICALLY DISPLAYING AND MANIPULATING IDENTIFIERS OF A MECHANICAL DESIGN, filed Jan. 31, 2002, having common ownership, and at least partial common inventorship, which is hereby fully incorporated by reference.

In various embodiments, associations between identifiers 310–314 and geometry pieces 303–307 may be advantageously generated and maintained on demand. Examples of maintaining associations between identifiers and geometry pieces may be found in co-pending U.S. patent application Ser. No. 10/177,819, titled ON DEMAND IDENTIFIER AND GEOMETRY PIECE ASSOCIATION IN A COMPUTER AIDED DESIGN (CAD) ENVIRONMENT, filed Jun. 21, 2002; having common ownership, and at least partial common inventorship, which is hereby fully incorporated by reference.

As a result, a simplified generation of various identifiers is facilitated, while providing increased versatility. In particular, automatic generation of geometric shapes for identifiers is facilitated utilizing a single variable.

FIG. 4 illustrates an exemplary table of inputs and resulting identifier shape, in accordance with one embodiment of the present invention. In FIG. 4, a table 400 has a first column 410 having various received inputs. As described previously, in the illustrated embodiment, the received inputs are single variables. Moreover, the single variables are alphanumeric ranging from 0-n. A second column 415 has corresponding shapes for identifiers from the inputs of the first column 410.

In accordance with the embodiment, various identifier shapes are generated in response to various received alphanumeric inputs. As shown in FIG. 4, a received alphanumeric input of 0 corresponds to an identifier having a shape of a circle. An alphanumeric input of 1 corresponds to an identifier having a shape where an underline is generated for text, such as the identifier 314 (shown in FIG. 3), and an alphanumeric input of 2 corresponds to an identifier having a shape where two lines are generated over and under text. Additionally, a received alphanumeric input of 3 corresponds to a polygon having 3 sides being generated (i.e., a triangle). Accordingly, an alphanumeric input of n corresponds to a polygon having n number of sides, e.g., 6 corresponds to a six-sided polygon known as a hexagon.

In an alternate embodiment, the dialogue box 200 (shown in FIG. 2) may include a field to receive an input for alternate forms of n-sided polygons. For example, a received alphanumeric input of 4 may correspond to a four-sided polygon having equal-length sides meeting at right angles (i.e., a square), a four sided polygon having two pairs of parallel sides (i.e., a rectangle), a four sided polygon having only one pair of parallel sides (i.e., a trapezoid), and so forth.

In yet another alternate embodiment, the dialogue box 200 (shown in FIG. 2) may include a field to receiving an input for sum of angles of an n-sided polygon. For example, instead of receiving an alphanumeric input, an input specifying a closed polygon having a sum of angles of 720 degrees may be received, which in turn, a polygon having the sum angle of 720 degrees is generated (i.e., a hexagon).

In various embodiments, the size of the identifier may be based at least in part on the size of the text to be displayed. For example, the dialogue box 200 (shown in FIG. 2) may include a field to receiving an input for a minimum distance between the shape and the text. That is, a minimum distance may be selected between the text and a closest side of the identifier. Accordingly, for this embodiment, a change in the size of the text may automatically change the size of the identifier, in particular, the shape of the identifier.

As a result, automatic generation of geometric shapes for identifiers is facilitated utilizing a single variable.

Figure 5:
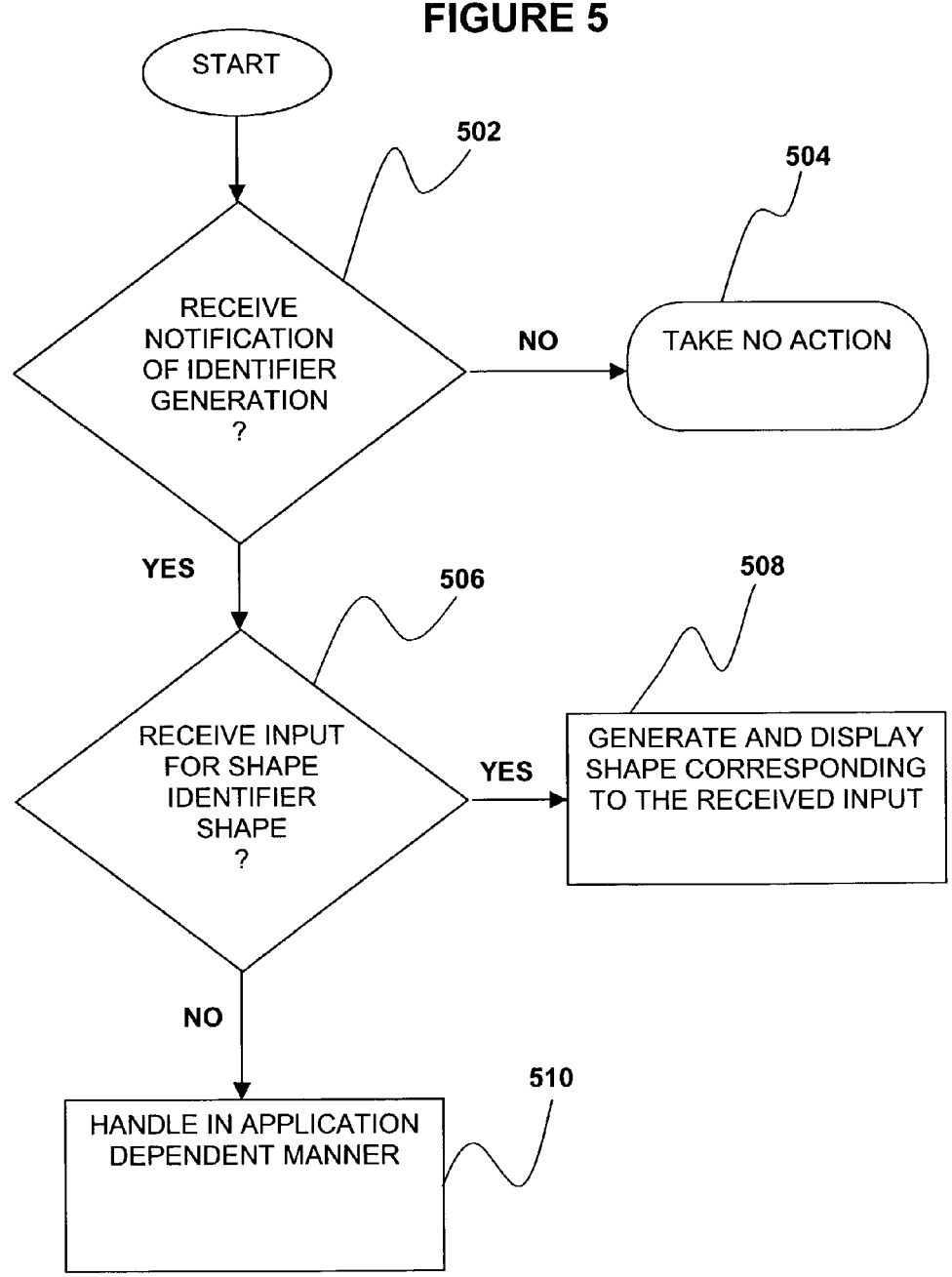
FIG. 5 illustrates the operational flow of the relevant aspects of identifier generation engine 103 of FIG. 1 for generating identifier shapes, in accordance with one embodiment of the present invention.

FIG. 5 illustrates the operational flow of the relevant aspects of identifier generation engine 103 of FIG. 1 for generating identifier shapes, in accordance with one embodiment of the present invention. For the illustrated embodiment, identifier generation engine 103 is programmed in accordance with an event driven model (i.e., graphical display manager 103 is designed to be executed in a system environment where various event notification services are available from the operating system). One example of such operating system suitable for practicing the invention is Windows® operating system, available from Microsoft Corporation of Redmond, Wash. In alternate embodiments, graphical display manager 103 may be implemented in other programming approaches known in the art.

At operational block 502, the identifier generation engine 103 determines if an event notification is related to a request to generate an identifier. If it is determined that the received event notification is not related to requesting identifier generation, the identifier generation engine 103 takes no action, operational block 504. However, if an event notification is related to requesting an identifier generation, identifier generation engine 103 further determines if an input corresponding to the shape of the identifier is received, operational block 506. As previously described, the input corresponding to the shape of the identifier may be a single variable input, such as, but not limited to, an alphanumeric input. Furthermore, the input may be received via a dialogue box, such as the dialogue box 200 (shown in FIG. 2).

If upon determining that an input corresponding to the shape of the identifier is received, identifier generation engine 103 automatically generates and displays the identifier with the shape corresponding to the received input, operational block 508. As described previously, in one embodiment, determining if the input corresponds to a shape for the identifier may be a number that specifies the number of sides of a polygon. That is, if a 0 is received, the corresponding shape may be a circle. Alternatively, if a number less than three is received, identifier generation engine 103 may determine that a closed polygon is not possible, and accordingly generate an identifier with an underline or an over/underline. Any received input number that is more than three, identifier generation engine 103 may determine that a closed polygon may be generated, and accordingly, generate a polygon having the corresponding number of sides.

If, however, it is determined that an input corresponding to the shape of the identifier is not received, identifier generation engine 108 handles the event notification in an application dependent manner, operation block 510. For example, the identifier may be generated with only text. That is, text having a leader and a termination at a geometry piece.

Figure 6:
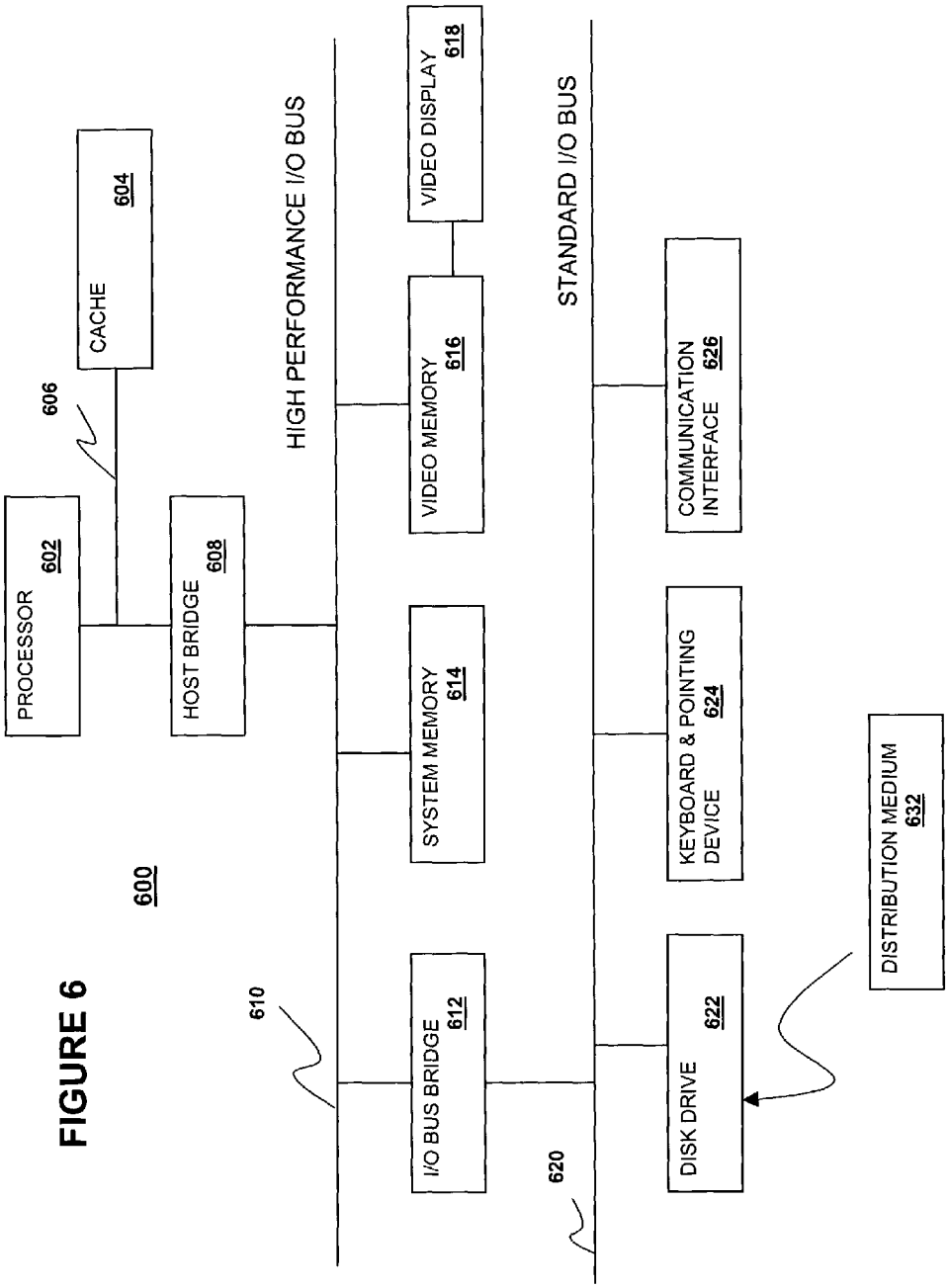
FIG. 6 illustrates one embodiment of a computer system suitable to be programmed with the mechanical design drawing application of the present invention.

FIG. 6 illustrates one embodiment of a computer system suitable to be programmed with the mechanical design drawing application of the present invention. As shown, for the illustrated embodiment, computer 600 includes processor 602, processor bus 606, high performance I/O bus 610 and standard I/O bus 620. Processor bus 606 and high performance I/O bus 610 are bridged by host bridge 603, whereas I/O buses 610 and 612 are bridged by I/O bus bridge 612. Coupled to processor bus 606 is cache 604. Coupled to high performance I/O bus 610 are system memory 614 and video memory 616, against which video display 613 is coupled. Coupled to standard I/O bus 620 are disk drive 622, keyboard and pointing device 624, and communication interface 626.

These elements perform their conventional functions known in the art. In particular, disk drive 622 and system memory 614 are used to store permanent and working copies of the mechanical design system. The permanent copies may be pre-loaded into disk drive 622 in factory, loaded from distribution medium 632, or down loaded from a remote distribution source (not shown). Distribution medium 632 may be a tape, a CD, a DVD or other storage medium of the like. The constitutions of these elements are known. Any one of a number of implementations of these elements known in the art may be used to form computer system 600.

In general, those skilled in the art will recognize that the present invention is not limited by the details described, instead, the present invention can be practiced with modifications and alterations within the spirit and scope of the appended claims. The description is thus to be regarded as illustrative instead of restrictive on the present invention.

In alternative embodiments, the present invention is implemented in discrete hardware or firmware. For example, one or more application specific integrated circuits (ASICs) could be programmed with one or more of the above described functions of the present invention. In another example, one or more functions of the present invention could be implemented in one or more ASICs on additional circuit boards and the circuit boards could be inserted into the computer(s) described above. In another example, field programmable gate arrays (FPGAs) or static programmable gate arrays (SPGA) could be used to implement one or more functions of the present invention. In yet another example, a combination of hardware and software could be used to implement one or more functions of the present invention.

Thus, a more user friendly approach for creating identifiers has been described.

What is claimed is:

1. A method comprising:
    receiving a request to generate an identifier in a computer aided design (CAD) application, the identifier identifying a component in a computer aided design;
    determining if an input corresponds to a predefined shape for the identifier, the input being an input in the form of a single variable; and
    generating the identifier with the predefined shape based at least in part on the input.

2. The method of claim 1, wherein said receiving a request comprises receiving an indication of an interaction of a panel associated with parameters for identifier generation.

3. The method of claim 2, wherein said receiving an indication of an interaction comprises receiving an indication of an interaction with a panel associated with parameters for identifier generation in an identifier parameter dialogue box.

4. The method of claim 1, wherein said determining if an input corresponds to a predefined shape comprises determining if an alphanumeric input corresponds to a predefined shape for the identifier.

5. The method of claim 1, wherein said determining if an input corresponds to a predetermined defined shape comprises determining if an input in the form of a number corresponds to a predefined shape for the identifier.

6. The method of claim 5, wherein said determining if an input in the form of a number corresponds to a predefined shape for the identifier comprises determining if an input in the form of a number corresponds to a number of sides of a polygon.

7. The method of claim 6, wherein said determining if an input in the form of a number corresponds to a number of sides of a polygon comprises determining if an input in the form of a number corresponds to a number of sides of a closed polygon.

8. The method of claim 1, wherein said determining if an input corresponds to a predefined shape comprises determining if an input in the form of a letter corresponds to a predefined shape for the identifier.

9. The method of claim 8, wherein said determining if an input in the form of a letter corresponds to a predefined shape for the identifier comprises determining if an input in the form of a letter corresponds to a first letter of a name of a polygon.

10. The method of claim 1, wherein said determining if an input corresponds to a predefined shape comprises determining if an input in the form of a sum of angles of a polygon corresponds to a predefined shape for the identifier.

11. The method of claim 1, wherein said determining if an input corresponds to a predefined shape comprises determining if an input corresponds to a predefined shape in a table.

12. The method of claim 1, wherein said generating the identifier comprises generating a polygon having a number of sides based at least in part on the input.

13. The method of claim 1, wherein said generating the identifier comprises generating a polygon having as part of its name, a letter based at least in part on the input.

14. The method of claim 1, wherein said generating the identifier comprises generation a polygon associated with a sum of angles based at least in part on the input.

15. The method of claim 1, wherein said generating the identifier comprises, generating a shape in the form of a sandwich based at least in part on the input.

16. The method of claim 1, wherein said generating the identifier comprises generating a shape in the form of an underline based at least in part on the input.

17. An apparatus comprising:
    a storage medium having stored therein a plurality of programming instructions, which when executed, the instructions cause the apparatus to receive a request to generate an identifier in a computer aided design (CAD) application, the identifier identifying a component in a computer aided design, determine if an input corresponds to a predefined shape for the identifier, the input being an input in the form of a single variable, and generate the identifier with the predefined shape based at least in part on the input; and
    a processor coupled to the storage medium to execute the programming instructions.

18. The apparatus of claim 17, wherein said programming instructions, which when executed, cause the apparatus to receive an indication of an interaction of a panel associated with parameters for identifier generation.

19. The apparatus of claim 18, wherein said programming instructions, which when executed, cause the apparatus to receive an indication of an interaction with a panel associated with parameters for identifier generation in an identifier parameter dialogue box.

20. The apparatus of claim 17, wherein said programming instructions, which when executed, cause the apparatus to determine if an alphanumeric input corresponds to a predefined shape for the identifier.

21. The apparatus of claim 17, wherein said programming instructions, which when executed, cause the apparatus to determine if an input in the form of a number corresponds to a predefined shape for the identifier.

22. The apparatus of claim 21, wherein said programming instructions, which when executed, cause the apparatus to determine if an input in the form of a number corresponds to a number of sides of a polygon.

23. The apparatus of claim 22, wherein said programming instructions, which When executed, cause the apparatus to determine if an input in the form of a number corresponds to a number of sides of a closed polygon.

24. The apparatus of claim 17, wherein said programming instructions, which when executed, cause the apparatus to determine if an input in the form of a letter corresponds to a predefined shape for the identifier.

25. The apparatus of claim 24, wherein said programming instructions, which when executed, cause the apparatus to determine if an input in the form of a letter corresponds to a first letter of a name of a polygon.

26. The apparatus of claim 17, wherein said programming instructions, which when executed, cause the apparatus to determine if an input in the form of a sum of angles of a polygon corresponds to a predefined shape for the identifier.

27. The apparatus of claim 17, wherein said programming instructions, which when executed, cause the apparatus to determine if an input corresponds to a predefined shape in a table.

28. The apparatus of claim 17, wherein said programming instructions, which when executed, cause the apparatus to generate a polygon having a number of sides based at least in part on the input.

29. The apparatus of claim 17, wherein said programming instructions, which when executed, cause the apparatus to generate a polygon having as part of its name, a letter based at least in part on the input.

30. The apparatus of claim 17, wherein said programming instructions, which when executed, cause the apparatus to generate a polygon associated with a sum of angles based at least in part on the input.

31. The apparatus of claim 17, wherein said programming instructions, which when executed, cause the apparatus to generate a shape in the form of a sandwich based at least in part on the input.

32. The apparatus of claim 17, wherein said programming instructions, which when executed, cause the apparatus to generate a shape in the form of an underline based at least in part on the input.

33. An article of manufacture having stored therein a plurality of programming instructions, which when executed, the instructions cause the machine to receive a request to generate an identifier in a computer aided design (CAD) application, the identifier identifying a component in a computer aided design, determine if an input corresponds to a predefined shape for the identifier, the input being a single variable input, and generate the identifier with the predefined shape based at least in part on the input.

34. The article of manufacture of claim 33, wherein said programming instructions, which when executed, cause the machine to receive an indication of an interaction of a panel associated with parameters for identifier generation.

35. The article of manufacture of claim 34, wherein said programming instructions, which when executed, cause the machine to receive an indication of an interaction with a panel associated with parameters for identifier generation in an identifier parameter dialogue box.

36. The article of manufacture of claim 33, wherein said programming instructions, which when executed, cause the machine to determine if an alphanumeric input corresponds to a predefined shape for the identifier.

37. The article of manufacture of claim 33, wherein said programming instructions, which when executed, cause the machine to determine if an input in the form of a number corresponds to a predefined shape for the identifier.

38. The article of manufacture of claim 37, wherein said programming instructions, which when executed, cause the machine to determine if an input in the form of a number corresponds to a number of sides of a polygon.

39. The article of manufacture of claim 38, wherein said programming instructions, which when executed, cause the machine to determine if an input in the form of a number corresponds to a number of sides of a closed polygon.

40. The article of manufacture of claim 33, wherein said programming instructions, which when executed, cause the machine to determine if an input in the form of a letter corresponds to a predefined shape for the identifier.

41. The article of manufacture of claim 40, wherein said programming instructions, which when executed, cause the machine to determine if an input in the form of a letter corresponds to a first letter of a name of a polygon.

42. The article of manufacture of claim 33, wherein said programming instructions, which when executed, cause the machine to determine if an input in the form of a sum of angles of a polygon corresponds to a predefined shape for the identifier.

43. The article of manufacture of claim 33, wherein said programming instructions, which when executed, cause the machine to determine if an input corresponds to a predefined shape in a table.

44. The article of manufacture of claim 33, wherein said programming instructions, which when executed, cause the machine to generate a polygon having a number of sides based at least in part on the input.

45. The article of manufacture of claim 33, wherein said programming instructions, which when executed, cause the machine to generate a polygon having as part of its name, a letter based at least in part on the input.

46. The article of manufacture of claim 33, wherein said programming instructions, which when executed, cause the machine to generate a polygon associated with a sum of angles based at least in part on the input.

47. The article of manufacture of claim 33, wherein said programming instructions, which when executed, cause the machine to generate a shape in the form of a sandwich based at least in pat-t on the input.

48. The article of manufacture of claim 33, wherein said programming instructions, which when executed, cause the machine to generate a shape in the form of an underline based at least in part on the input.

* * * * *

UNITED STATES PATENT AND TRADEMARK OFFICE
CERTIFICATE OF CORRECTION

PATENT NO. : 7,088,360 B1  
APPLICATION NO. : 10/199971  
DATED : August 8, 2006  
INVENTOR(S) : Kenneth L. Davis and William E. Bogan Page 1 of 1

It is certified that error appears in the above-identified patent and that said Letters Patent is hereby corrected as shown below:

Column 9, Line 51 at Claim 5; replace:
"input corresponds to a predetermined defined shape" with
--input corresponds to a predefined shape--

Column 10, Line 21 at Claim 14; replace:
"identifier comprises generation a polygon associated with a" with
--identifier comprises, generating a polygon associated with a--

Column 10, line 65 at Claim 23; replace:
"which When executed, cause" with
--which when executed, cause--

Column 12, Line 50 at Claim 47; replace:
"at least in pat-t on the input." with
--at least in part on the input.--

Signed and Sealed this

Second Day of October, 2007

JON W. DUDAS  
*Director of the United States Patent and Trademark Office*